United States Patent [19]

Johnston et al.

[11] 4,066,445

[45] Jan. 3, 1978

[54] PROCESS FOR PRODUCING MAGNESIUM UTILIZING ALUMINUM METAL REDUCTANT

[75] Inventors: James D. Johnston; Robert N. Sanders; James M. Wood, Jr., all of Baton Rouge, La.

[73] Assignee: Ethyl Corporation, Richmond, Va.

[21] Appl. No.: 772,652

[22] Filed: Feb. 28, 1977

Related U.S. Application Data

[63] Continuation-in-part of Ser. No. 610,430, Sept. 4, 1975, Pat. No. 4,033,759.

[51] Int. Cl.$^2$ ............................................. C22B 45/00
[52] U.S. Cl. .................................................... 75/67 R
[58] Field of Search .............................. 75/67 R, 10 A

[56] References Cited

U.S. PATENT DOCUMENTS 4,033,759   7/1977   Johnston et al. .................... 75/67 R Primary Examiner—M. J. Andrews
Attorney, Agent, or Firm—Donald L. Johnson; John F. Sieberth; Paul H. Leonard

[57] ABSTRACT

Magnesium metal is produced by the reaction of aluminum metal with a calcium magnesium aluminate slag or with magnesium oxide in the presence of such slag, wherein the silicon dioxide content of the slag is maintained at five weight percent or less. An excess of aluminum metal relative to the amount of magnesium oxide is employed thereby obtaining a high conversion of the magnesium oxide to magnesium metal.

19 Claims, No Drawings

PROCESS FOR PRODUCING MAGNESIUM UTILIZING ALUMINUM METAL REDUCTANT

CROSS REFERENCE TO RELATED APPLICATION

This is a continuation-in-part of application Ser. No. 610,430 filed on Sept. 4, 1975 now U.S. Pat. No. 4,033,759.

BACKGROUND OF THE INVENTION

The present invention relates to the production of magnesium metal by the reduction of magnesium oxide at elevated temperatures in the presence of an aluminum metal reducing agent and a molten oxidic slag, in an electric furnace, and the condensation of vaporized magnesium in a condenser.

An advantageous method of producing magnesium lies in the chemical reduction of magnesium oxide with a reducing agent in the presence of a molten oxide slag, in an electric furnace. A variety of metallothermic processes, as they are commonly called, for the production of magnesium employing various reducing agents, various types of reactants, and under various conditions of temperatures and pressures have been proposed.

In general, the various metallothermic processes are concerned with the production of metallic magnesium by the reduction of magnesium oxide with a metal reductant at elevated temperatures. Magnesium oxide, usually in the form of calcined dolomite (dolime) or calcined magnesite or mixtures thereof, is caused to react with a metallic reducing agent, such as silicon, aluminum, calcium or mixtures or alloys thereof, in the presence of a molten slag bath in a furnace at temperatures in excess of 1300° C, to release magnesium vapor which may be condensed and collected. Some of the processes are carried out in the presence of an inert gas.

An early process of this type, called the Pidgeon process provides for the production of magnesium by the reduction of magnesium oxide with ferrosilicon.

A more recent process is exemplified by U.S. Pat. 2,971,833 and is known as the Magnetherm process. The process is operated under a very high vacuum (pressure ranging between 5 and 20 millimeters of mercury) and at a temperature of about 1500° C utilizing an electric furnace. Silicon is employed as the reductant, preferably in the form of ferrosilicon containing 70–80 percent Si, silicon of a purity in excess of 97%, or an aluminum-ferrosilicon. Care is taken to avoid that the silicon content of the residual ferrosilicon drops below 33.5%. A magnesia containing substance is dissolved in a liquid slag consisting essentially of lime, silica and alumina wherein the ratio of calcium oxide to silicon dioxide and the ratio of aluminum oxide to silicon dioxide are controlled.

Processes employing aluminum metal as the reductant are exemplified by U.S. Pat. Nos. 3,782,922; 2,527,722 and 2,527,724. The first patent discloses the production of magnesium by the reduction of magnesium oxide from a mixture of magnesium oxide and calcium oxide with a reducing agent comprising at least 85% aluminum in the presence of a molten calcium-aluminate slag bath at a temperature of about 1300°–1700° C and a pressure of about atmospheric. Slag is removed when the magnesium oxide content thereof is less than five percent, with the slag comprising 35–65 percent aluminum oxide, 35–55 percent calcium oxide and 0–10 percent silicon dioxide. The other two patents utilize magnesium silicate in pure or ore form and aluminum as reactants. Dolomite is also used in the former and the magnesium silicate is of a particular granular size in the latter.

U.S. Pat. No. 3,658,509 also discloses the use of aluminum as the reductant, as well as silicon and aluminum-silicon alloys with the latter being preferred. In such process, an inert gas is used to obviate at least in part the need of a high vacuum, and the slag contains 20–50 percent silicon dioxide.

Copending application Ser. No. 610,430, now U.S. Pat. No. 4,033,759 discloses the use of aluminum metal as a reductant in such a manner as to produce a slag wherein, by weight percent, calcium oxide ranges from 30–65, aluminum oxide ranges from 28–64, magnesium oxide ranges from 6–13 and silicon dioxide is equal to or less than 5.

The primary object of this invention is to provide an improved process for production of magnesium metal wherein aluminum metal is reacted with a calcium magnesium aluminate slag, which eliminates the disadvantages of the prior art processes, while retaining the benefits thereof.

Another object of this invention is to provide a process for production of magnesium metal at atmospheric pressure by reaction of aluminum metal with a calcium magnesium aluminate slag, or with magnesium oxide in the presence of such slag, wherein the silicon dioxide content of the slag is maintained at a low level.

Another object of the invention is to provide a process for producing magnesium metal utilizing aluminum metal as the reductant, wherein magnesium vapor is produced at a pressure of one atmosphere thereby eliminating the need for vacuum equipment and permitting a continuous operation at such normal pressure.

An important object of the present invention is to provide a process of the foregoing type which is economical and which can utilize aluminum metal scrap as the metal reductant.

Other objects and advantages of the present invention will become more readily apparent from a consideration of the description hereinafter.

SUMMARY OF THE INVENTION

The instant invention relates to a process for the production of magnesium metal by reaction of a calcium magnesium aluminate slag or of magnesium oxide in the presence of such slag, with aluminum metal of about 80 percent or greater purity at reasonable pressures, preferably about atmospheric pressure, and at elevated temperatures of about 1500°–1700° C, preferably about 1550°–1600° C. Magnesium evolves as a vapor and is condensed and collected in suitable apparatus. The concentration of silicon dioxide in the slag is kept at a low value, about five weight percent or less, preferably two weight percent or less.

An excess of aluminum metal relative to the amount of magnesium oxide is employed thereby obtaining a high conversion of the magnesium oxide to magnesium metal.

DESCRIPTION OF THE PREFERRED EMBODIMENT

In the process of the present invention, aluminum metal is reacted with a calcium magnesium aluminate slag, or with magnesium oxide in the presence of such slag to produce magnesium metal. The process is illustrated by the following equations:

$$1.12\,CaO + 3.0\,MgO + (2 + x)Al + Slag \rightarrow$$
$$CaO\cdot Al_2O_3 + 0.12\,CaO + 3\,Mg \uparrow + xAl + slag$$

wherein, $x =$ excess Al used and ranges from 0.1–2.0 and preferably from 0.1–0.2

The reduction reaction is carried out in an internally heated electric furnace at a temperature of about 1500°–1700° C, with 1550°–1600° C being preferred and about 1550° C being most preferred and at a pressure of about 0.5–2.0 atmospheres, preferably about atmospheric pressure. The concentration of the various slag components is controlled. Silicon dioxide is kept at a low level, no greater than five weight percent and preferably about two weight percent or less. As the reaction continues, MgO in the slag is consumed by reaction with the aluminum metal. Additional MgO or dolime (T CaO·MgO, where $0.5 \leq T \leq 2.0$) is added as necessary to maintain the desired slag composition as will be more fully explained hereinafter. It is necessary however that the silicon dioxide content of the slag be kept at five weight percent or less. Materials added to the slag should also contain no more than 5 weight percent $SiO_2$.

It has been found to be advantageous to operate with a reducing agent containing 80 weight percent or more aluminum metal, to restrict silicon dioxide content of feed materials and slag to 5 weight percent or less, and to use an excess of aluminum metal reductant such that slag in the reactor and slag tapped or withdrawn from the reactor contain 6–16 weight percent magnesium oxide. This combination of reactants provides a superior process, one in which the reaction between aluminum metal and magnesium readily occurs, one in which a high utilization of aluminum metal is obtained as the excess aluminum can be recovered and recycled, and one in which a high conversion of magnesium oxide to magnesium metal is obtained. The advantages of using these conditions will become more apparent from the discussion in the following paragraphs.

Preferably, the various reactants are added in their respective required amounts simultaneously and at a sufficiently slow rate to permit the desired reaction to take place. A deficiency of magnesium oxide rather than an excess thereof has been unexpectedly found to produce superior results.

Aluminum is an active metal, and reacts at room temperature with a variety of acids, bases, and other chemical reagents. Its chemical reactivity extends also to the higher temperatures required for the production of magnesium metal, and in high temperature systems it is a superior reducing agent in comparison with less active metallic reducing agents, such as ferrosilicon or silicon metal.

Aluminum metal is a more active reducing agent, in that it produces a higher vapor pressure of the desired magnesium product at a lower temperature than other known reducing agents. The usual method of removing magnesium from such high temperature reaction systems is as a vapor, and it is subsequently condensed to a liquid or solid for recovery. Aluminum metal is superior as a reducing agent to less active metals such as ferrosilicon or silicon.

In addition to using aluminum metal as a reducing agent, it is also essential to keep the concentration of silicon dioxide in the reaction at a low value, at least less than or equal to five weight percent. Because of its high reactivity, aluminum metal at high temperatures reacts not only with magnesium oxide, but also with silicon dioxide and other siliceous materials. Silicon metal is the product from reduction of silicon dioxide or siliceous materials, rather than the desired magnesium metal. Thus when silicon dioxide or other siliceous materials are present in the reactor, part of the expensive aluminum reducing agent will be converted to a by-product, namely silicon metal, rather than the desired magnesium metal product. Although it is possible to force the co-produced silicon metal to react with magnesium oxide in the reactor to yield magnesium metal, to do so requires the application of higher temperatures and lower pressures than when aluminum metal is reacted directly with magnesium oxide in the absence of siliceous materials. Silicon dioxide concentration in the reactor and of incoming feed materials must be restricted to five weight percent or less.

The rate and completeness of a chemical reaction are dependent on the concentrations of the reactants. Thus, in the reaction:

$$1.12\,CaO + 3.0\,MgO + (2 + x)\,Al \rightarrow CaO\cdot Al_2O_3 + 0.12\,CaO + 3\,Mg\uparrow$$

the rate of magnesium production and the completeness of the reaction are dependent on the concentrations of aluminum metal and magnesium oxide in the reactor. The high concentration of aluminum metal employed in this invention facilitates reaction. The amount of aluminum metal used or fed into the reactor ranges from 105 percent to 200 percent of the stoichiometric amount required to react with the magnesium oxide fed into the reactor. The excess amount of aluminum metal is thus five percent to 100 percent of the stoichiometric amount of the aluminum required to react with the magnesium oxide. The concentration of magnesium oxide in the reactor and in the tapped slag must be limited to avoid increasing the melting point of the slag to too high a value and to avoid excessive loss of magnesium oxide in the tapped slag. The magnesium oxide concentration range of 6–16 weight percent inclusive, in the reactor, and in the tapped slag satisfies the need for completeness of reaction while avoiding excessive concentrations of magnesium oxide in the slag.

Although aluminum metal used in the process should have a purity equal to or greater than 80 weight percent and preferably greater than or equal to 90 weight percent, most aluminum scrap is suitable. Metallic impurities in the aluminum, such as iron, manganese and silicon can be tolerated. Such impurities are inert under the process conditions and can be withdrawn from the furnace or reactor from time to time, for example, when the slag is tapped. Non-metallic impurities in the aluminum, for example, aluminum oxide can also be tolerated. The total of these non-metallic impurities other than $Al_2O_3$, MgO or CaO should not exceed five weight percent. The aluminum metal should also be dried before use and should contain no more than 0.25 weight percent water.

The oxides and other compounds making up the slag composition are as follows by weight percent:

|  | Range | Preferred Range |
|---|---|---|
| CaO | 30–65 | 33–62 |
| $Al_2O_3$ | 28–64 | 32–62 |
| MgO | 6–16 | 6–10 |
| SiO | $\leq 5$ | $\leq 2$ |

-continued

| | Range | Preferred Range |
|---|---|---|
| Other oxides, halides, sulfides | ≦5 | ≦2 |

Dolime, CaO or MgO may be added to the slag separately or in combination as needed to maintain the desired slag composition. As stated before, the dolime need not contain equal amounts of CaO and MgO, but may contain T moles of CaO per mole MgO, e.g., T CaO·1 MgO, where $0.5 \leq T \leq 2.0$. These oxides should also contain not more than 5 weight percent $SiO_2$ and preferably not more than 2 weight percent. Such oxides should also be substantially free of $H_2O$ and $CO_2$ before use and should contain not more than 0.5 weight percent $H_2O$ and 0.5 weight percent $CO_2$. Additional MgO is added as necessary to maintain 6–16 weight percent MgO in the slag.

The reaction should be carried out at a temperature of about 1500°–1700° C, preferably about 1550°–1600° C and at a pressure range of about 0.5–2.0 atmospheres, preferably about 1.0 atmosphere.

In carrying out the invention, a slag of a composition within the foregoing ranges is prepared and melted. The various slag ingredients, CaO, MgO, dolime, and $Al_2O_3$ may be mixed together or a slag of a suitable composition form a previous operation may be used. An atmosphere of inert gas, such as argon or hydrogen is provided during melting. Heat is supplied for melting by suitably locating electrodes so as to pass a current through the slag, or by any other suitable means. After the desired temperature of the molten slag is achieved, a stream of aluminum particles is charged into the slag. Simultaneously therewith, an oxide feed stream containing MgO and dolime is added to the slag to keep its composition from changing. Alternatively, the aluminum metal and oxide feed may be intermingled, and added to the reactor as a mixture. Magnesium vapor is evolved from the surface of the slag, is conducted to a suitable condenser, and is condensed at a pressure of one atmosphere. An inert gas such as argon or hydrogen is used to prevent air from contacting the magnesium. However, the inert gas does not flow continuously from reactor to condenser, and hence does not transport magnesium metal vapor from reactor to condenser. As the reaction proceeds, the slag level in the reactor increases. From time to time, a portion of the slag and any unreacted inert metals such as iron, silicon, etc. are removed through a suitable tap hole in the reactor.

Examples

The examples described in the following table are illustrative of the process, and are carried out as described hereinbefore. The reactor is kept at a temperature of 1550° C ± 10° C and at about atmospheric pressure. Reactants and other oxides are added to the reactor either separately, or as mixtures. MgO is added both as the individual oxide and as dolime. The reaction which occurs in the reactor yields magnesium metal vapor and slag. The magnesium metal vapor flows to a condenser, and is condensed to a liquid or solid. Slag remains in the reactor and is removed from time to time.

| | Feed | | | | | Products | | | | |
|---|---|---|---|---|---|---|---|---|---|---|
| | Reactants and Other Oxides - Moles | | | | | Moles Mg Metal | Grams Slag Produced | Slag Composition wt % | | |
| | | | Dolime | | Al Metal | | | | | |
| Example | MgO | CaO | MgO | CaO | | | | MgO | $Al_2O$ | CaO |
| 1* | 0.68 | 2.08 | 1.46 | 1.46 | 1.9 | 1.4 | 406 | 10 | 45 | 46 |
| 2 | 1.88 | | 1.10 | 1.10 | 2.2 | 2.4 | 143 | 16 | 52 | 32 |
| 3 | 1.88 | | 1.10 | 1.11 | 2.4 | 2.7 | 178 | 7 | 59 | 34 |
| 4 | 1.88 | | 1.10 | 1.11 | 2.9 | 2.7 | 174 | 8 | 58 | 34 |

*Control Sample - Following Teachings of Serial No. 610,430

From the examples, it is readily seen that an excess of aluminum metal in accordance with the instant invention produces substantially high yields of magnesium metal.

The foregoing disclosure and description of the invention is illustrative and explanatory thereof and various changes may be made within the scope of the appended claims without departing from the spirit of the invention.

What is claimed is:

1. A process for production of magnesium in a reaction-condensation system having a reducing furnace zone and a condensation zone, comprising reacting in the reducing furnace zone aluminum metal containing at least 80 weight percent aluminum and a calcium magnesium aluminate slag or magnesium oxide in the presence of said slag containing not more than five weight percent silicon dioxide, the amount of aluminum metal fed into the reducing furnace zone being in excess of the stoichiometric amount of aluminum required to react with the magnesium oxide fed into the reaction zone, and slag removed therefrom contains about 6–16 weight percent magnesium oxide, carrying out the reaction at a temperature of about 1500°–1700° C at a pressure of about 0.5–2.0 atmospheres, maintaining the silicon dioxide content and the magnesium oxide content of the molten oxidic slag in the reaction zone at least as low as five weight percent and about 6–16 weight percent, respectively, evolving magnesium vapor from the reaction zone to the condensation zone, and condensing and recovering the magnesium as a product.

2. The process of claim 1, wherein the excess amount of aluminum metal fed into the reducing furnace zone is from five percent to 100 percent of the stoichiometric amount of aluminum required to react with the magnesium oxide fed into the reaction zone.

3. The process of claim 1, wherein the excess amount of aluminum metal fed into the reducing furnace zone is from 5 percent to 10 percent of the stoichiometric amount of aluminum required to react with the magnesium oxide fed into the reaction zone.

4. The process of claim 1, wherein the reaction is carried out at a temperature of 1550°–1600° C.

5. The process of claim 1, wherein the reaction is carried out at a pressure of about one atmosphere.

6. The process of claim 1, wherein the silicon dioxide content of the molten oxidic slag is maintained at least as low as two weight percent.

7. The process of claim 1, wherein said aluminum has a purity of at least 90 weight percent.

8. The process of claim 1, wherein as the reaction continues, and as magnesium oxide in the slag is consumed by reacting with the aluminum, additional oxides are added as necessary to maintain the composition of the slag in weight percent as follows:

| | |
|---|---|
| calcium oxide (CaO) | 30 – 65 |
| aluminum oxide ($Al_2O_3$) | 28 – 64 |
| magnesium oxide (MgO) | 6 – 16 |
| silicon dioxide ($SiO_2$) | $\leq 5$ |
| and other oxides, halides, sulfides | $\leq 5$ |

9. The process of claim 8, wherein the magnesium oxide is in the form of calcined dolime of the formula T CaO·MgO where $0.5 \leq T \leq 2.0$.

10. The process of claim 1, wherein an inert gas is employed to prevent air from contacting the magnesium.

11. In a process for producing magnesium by reaction of magnesium oxide with aluminum in a reaction-condensation system and utilizing a molten oxidic slag, the improvement therein, wherein the aluminum has a purity of at least 80 weight percent, the amount of aluminum metal fed into the reaction zone is from 5 to 100 percent in excess of the stoichiometric amount of aluminum required to react with the magnesium oxide, the silicon dioxide content and the magnesium oxide content of the molten oxidic slag is maintained at less than about five weight percent of said slag and about 6–16 weight percent of said slag, respectively.

12. The process of claim 11, wherein the silicon dioxide content of the molten oxidic slag is maintained at less than about two weight percent of said slag.

13. A process for the production of magnesium metal in a reaction-condensation system having a reducing furnace zone and a condensation zone, comprising preparing and melting in the reaction zone a calcium magnesium aluminum oxide slag of the following weight percent composition:

| | |
|---|---|
| Calcium oxide (CaO) | 30 – 65 |
| Aluminum oxide ($Al_2O_3$) | 28 – 64 |
| Magnesium oxide (MgO) | 6 – 16 |
| Silicon dioxide ($SiO_2$) | $\leq 5$ | reacting with the molten oxidic slag in the reaction zone an aluminum metal of at least 80 weight percent purity, the amount of the aluminum metal being from five percent to 100 percent in excess of the amount of aluminum required to react stoichiometrically with the magnesium oxide, carrying out the reaction at a temperature of about 1500°–1700° C and at a pressure of about 0.5–2.0 atmospheres, periodically withdrawing molten oxidic slag from the reaction zone, maintaining the silicon dioxide content and the magnesium oxide content of the molten oxidic slag in the reaction zone and the molten oxidic slag withdrawn therefrom at five weight percent or less and about 6–16 weight percent, respectively, evolving magnesium vapor from the reaction zone to the condensation zone and recovering magnesium metal as a product.

14. The process of claim 13, wherein the silicon dioxide content of said slag is maintained at two weight percent or less.

15. The process of claim 13, wherein said temperature is about 1550°–1600° C.

16. The process of claim 13, wherein the excess amount of aluminum is from 5 percent to 10 percent of the stoichiometric amount of aluminum.

17. The process of claim 13, wherein said pressure is about one atmosphere.

18. The process of claim 13, wherein the melting in the reaction zone is conducted in an atmosphere of an inert gas.

19. The process of claim 13, wherein the aluminum metal is aluminum scrap.

* * * * *